United States Patent [19]

Lasoen

[11] Patent Number: 5,249,481
[45] Date of Patent: Oct. 5, 1993

[54] PLANETARY GEAR UNITS

[75] Inventor: Jean-Jacques Lasoen, Villepreux, France

[73] Assignee: Massey-Ferguson Services N.V., Netherlands Antilles

[21] Appl. No.: 842,377

[22] PCT Filed: Aug. 7, 1991

[86] PCT No.: PCT/EP91/01487

§ 371 Date: Apr. 1, 1992

§ 102(e) Date: Apr. 1, 1992

[87] PCT Pub. No.: WO92/03672

PCT Pub. Date: Mar. 5, 1992

[30] Foreign Application Priority Data

Aug. 15, 1990 [GB] United Kingdom ............... 9017920

[51] Int. Cl.$^5$ ............................................. F16H 3/02
[52] U.S. Cl. ........................................ 74/745; 74/335; 475/134
[58] Field of Search ............ 475/131, 132, 134; 74/335, 745

[56] References Cited

U.S. PATENT DOCUMENTS

| | | | |
|---|---|---|---|
| 3,708,047 | 1/1973 | Kuhnle et al. | 475/132 X |
| 3,799,003 | 3/1974 | Van Dest | 475/134 X |
| 3,863,523 | 2/1975 | Starling et al. | 475/134 X |
| 3,945,265 | 3/1976 | Bell et al. | 74/745 X |
| 4,246,990 | 1/1981 | Strantz | 475/131 X |
| 4,478,106 | 10/1984 | Schreiner | 74/745 X |
| 4,653,352 | 3/1987 | Nakao et al. | 74/335 X |
| 4,742,731 | 5/1988 | Eldridge et al. | 74/335 X |
| 4,876,924 | 10/1989 | Fletcher et al. | 74/745 |
| 4,901,600 | 2/1990 | Wilson | 74/745 |

FOREIGN PATENT DOCUMENTS

| | | |
|---|---|---|
| 53506 | 10/1986 | European Pat. Off. |
| 1188652 | 4/1970 | United Kingdom . |
| 1383567 | 2/1975 | United Kingdom . |

Primary Examiner—Dirk Wright
Attorney, Agent, or Firm—MacMillan, Sobanski & Todd

[57] ABSTRACT

A gear unit provides a number of operative ratios engaged by fluid pressure operated clutches operated by clutch actuators. These actuators are controlled by two-position flow reversing valves, one valve for each fluid pressure operated actuator. These valves are hydraulically connected in series with at least one actuator connected downstream of the last valve in the series connection and at least one actuator connected between each valve of the series. A valve control means is provided for controlling the operating sequence of the valves so that by changing the operative condition of one valve at a time the operative ratio of the gear unit can be changed to the next adjacent ratio provided by the unit in a progressive manner throughout the entire ratio range of the unit.

16 Claims, 11 Drawing Sheets

| RATIO SELECTED | CLUTCH STATUS X=ENGAGED O=DISENGAGED | | | |
|---|---|---|---|---|
| | C1 | C2 | C3 | C4 |
| A | X | X | O | O |
| B | X | O | X | O |
| C | O | X | O | X |
| D | O | O | X | X |

| RATIO | CLUTCH STATUS | | | VALVE STATUS | | |
|---|---|---|---|---|---|---|
| | C1 | C2 | C6 | 150 | 200 | 250 |
| R1 | P | P | O | O | O | O |
| R2 | P | P | P | O | O | + |
| R3 | P | O | O | O | + | + |
| R4 | P | O | P | O | + | + |
| R5 | O | P | O | + | + | O |
| R6 | O | P | P | + | + | + |
| R7 | O | O | O | + | O | + |
| R8 | O | O | P | + | O | O |

P = PRESSURIZED
O = NO PRESSURE

+ = VALVE ENERGIZED
O = VALVE NOT ENERGIZED

| RATIO | CLUTCH STATUS | | | VALVE STATUS | | |
|---|---|---|---|---|---|---|
| | C1 | C2 | C6 | 150 | 200 | 250 |
| R1 | P | P | O | O | O | O |
| R2 | P | O | O | O | O | + |
| R3 | P | P | P | O | + | + |
| R4 | P | O | P | O | + | + |
| R5 | O | P | O | + | + | O |
| R6 | O | O | O | + | + | + |
| R7 | O | P | P | + | O | + |
| R8 | O | O | P | + | O | O |

P = PRESSURIZED
O = NO PRESSURE

+ = VALVE ENERGIZED
O = VALVE NOT ENERGIZED

PLANETARY GEAR UNITS

This invention relates to planetary gear units and particularly, though not exclusively, to such units for use in tractor transmissions.

Co-pending UK patent application No. 9017921.9 of even date describes and claims a planetary gear unit which includes planetary trains and clutches which when operated in certain combinations provide a plurality of substantially evenly spaced but relatively closely grouped ratios. The planetary gear unit is designed to provide a multi-ratio powershift unit which is particularly suitable for use as the input stage of a tractor transmission for use with an additional gearbox.

It is an object of the present invention to provide a planetary gear unit of the type described in the above referred to co-pending UK patent application having a simple but efficient arrangement for the control of the operative ratio of the unit.

Thus according to the present invention there is provided a gear unit providing a plurality of operative ratios and having a plurality of fluid pressure operated ratio engaging clutches, the gear unit being characterised by the inclusion of:

a plurality of fluid pressure operated clutch actuators one for each fluid pressure operated clutch, a plurality of two-position flow reversing valves, one valve for each fluid pressure operated actuator, the valves being hydraulically connected in series with at least one actuator connected downstream of the last valve in the series connection and at least one actuator connected between each valve of the series, and valve control means for controlling the operating sequence of the valves so that by changing the operative condition of one valve at a time the operative ratio of the gear unit can be changed to the next adjacent ratio provided by the unit in a progressive manner throughout the entire ratio range of the unit.

In a planetary gear unit in accordance with the above referred to co-pending UK patent application when moving up and down the available ratios in ratio order it is necessary when changing between certain adjacent ratios to change the pressurization state of both clutches so that sequential changes up and down the full range of available ratios cannot be made by operation of the clutches in a true binary manner (that is it is not possible to change between all adjacent ratios by changing the pressurization state of only one clutch).

A gear unit in accordance with the present invention overcomes the above difficulty by enabling the pressurisation state of both clutches to be changed by the single act of changing the position of only one of the valves thus the control system can effectively be operated in a binary manner which greatly simplifies its control.

In a gear unit having first and second fluid pressure operated ratio engaging clutches two flow reversing valves are provided in series, the last valve in the series being a three-port valve and the other valve being a four-port valve.

The first fluid pressure operated clutch may be paired with a first spring-engaged clutch and the second fluid pressure operated clutch may be paired with a second spring-engaged clutch, the arrangement being such that when the pressure operated clutch of each respective pair is engaged, the spring-engaged clutch of the respective pair is automatically disengaged and vice versa providing four ratio engaging clutch conditions.

Such an arrangement could be arranged to provide a powershift capability allowing ratio changes under full power between all four ratios by simply controlling the pressurisation state of the first and second clutches.

In an alternative arrangement the gear unit includes an additional two ratio section in series with in the four ratio section, said additional two ratio section including a third fluid pressure operated clutch and a third spring-engaged clutch to engage the two additional ratios and a third flow reversing valve for the control of an actuator for the third fluid pressure operated clutch.

In one form of the above arrangement the actuator of the fluid pressure operated clutch of the additional two ratio section is connected downstream of the last valve in the series connection and the other two clutch actuators are connected one between the second and last valves and the other between the first and second valves respectively.

In another form of the above arrangement, one of the clutch accuators of the four ratio section is connected downstream of the last valve in the series connection, the other clutch actuator of the four ratio section is connected between the second and last valves, and the actuator of the fluid pressure operated clutch of the two speed section is connected between the first and second valves.

In a still further form of the above arrangement, one of the actuators of the four ratio section is connected downstream of the last valve in the series connection, the other clutch actuator of the four ratio section is connected between the first and second valves, and the actuator of the fluid pressure operated clutch of the two ratio section is connected between the second and last valves.

Preferably in a planetary gear unit in accordance with the present invention the valve control means ensures that when changing between those adjacent ratios which require a change in engagement status of two fluid pressure operated clutches the engagement/disengagement of the two clutches is sequenced to ensure that if any other transient ratio state is engaged during the ratio change it is a ratio state moving in the same direction (ie up or down) as the desired ratio change.

For example, if a planetary gear unit has increasing ratios A, B, C and D and a change is being made between ratios B and C which requires a change in the engagement status of both clutches the sequencing will be controlled to ensure that if any transient ratio state is momentarily engaged it will be state D and not state A in order to minimise any jerk.

Similarly when changing from C to B the sequencing will ensure that if any transient ratio is momentarily engaged it will be state A and not state D in order to minimise any jerk.

This sequencing may be achieved by careful matching of the pressurised fluid flow rates to the clutch actuators, the volumes of the actuators and the free play in the clutches. Since clutch free play is difficult to control in view of its dependence on a series of manufacturing tolerances it may be necessary to accurately shim each clutch in order that the free play is repeatable and maintained within the design range for all gear units.

In accordance with a further aspect of the present invention the above sequencing concept is applied to a gear unit employing clutches for the engagement of the operative ratios of the unit, the clutches being grouped together in pairs each pair consisting of a fluid-pressure operated clutch and a spring-applied clutch which is automatically released when its paired fluid pressure operated clutch is engaged, in such a gear unit whenever a ratio change between adjacent ratios requires a change in the engagement status of two fluid pressure operated clutches the engagement/disengagement of said two clutches is sequenced to ensure that if any other transient ratio is engamed during the ratio change it will be a ratio state moving in the same direction (ie up or down) as the desired ratio change as outlined above.

In accordance with a still further aspect of the present invention a vehicle transmission is provided in which a first gear unit (e.g. the planetary gear unit P of FIGS. 1 and 5) provides a group of ratios and a second gear unit (e.g. main gearbox G of FIG. 2) arranged in series with the first unit provides a plurality of further ratios which multiply the number of groups of ratios provided by the first gear unit, the ratios of the second gear unit being chosen to provide considerable overlap between adjacent groups of ratios provided by the first gear unit (see FIG. 8) to ensure that at whatever speed it is necessary to operate the associate vehicle, the vehicle operator can select a ratio in the second gear unit such that the required operating speed can be provided by a mid-ratio of one of the groups of ratios provided by the first gear unit.

The invention also provides an actuating system for all the above described gear units.

Several embodiments of the present invention will now be described, by way of example only, with reference to the following drawings in which.

Figures 1, 3:
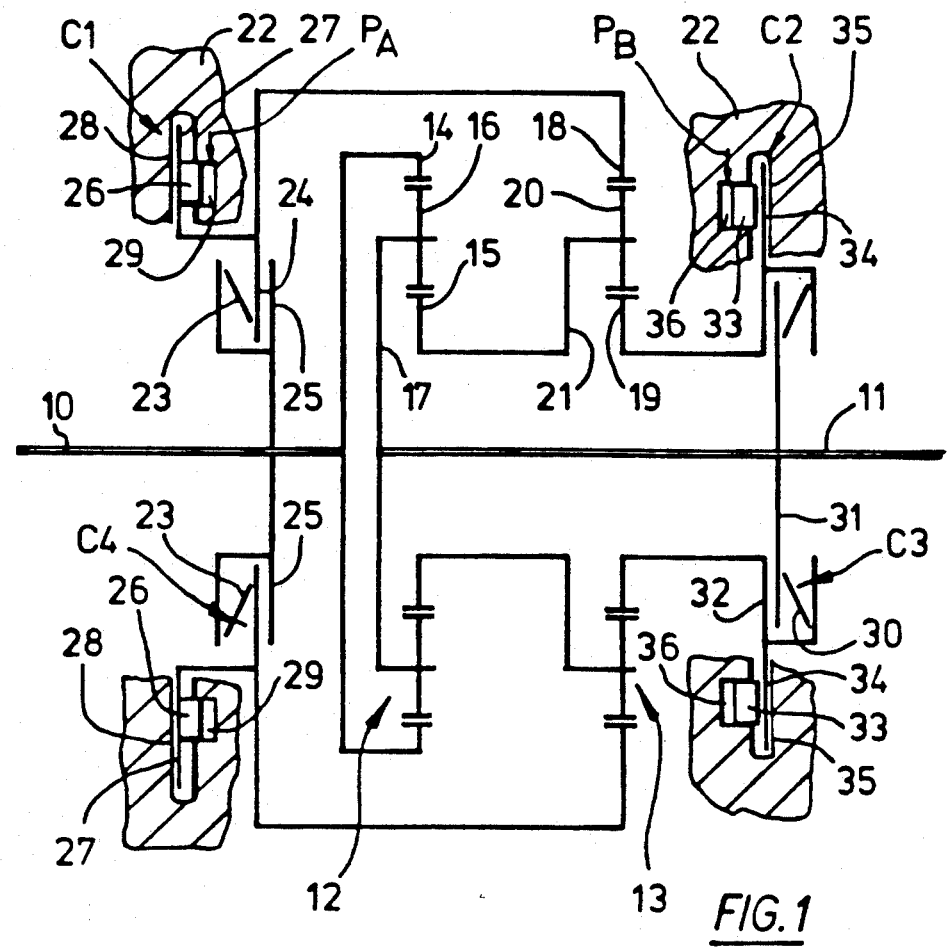
FIG. 1 is a diagrammatic vertical section through a four-ratio planetary gear unit.
FIG. 3 is a table indicating the engagement status of each clutch for each ratio of the planetary gear unit of FIG. 1.
Figure 6A:
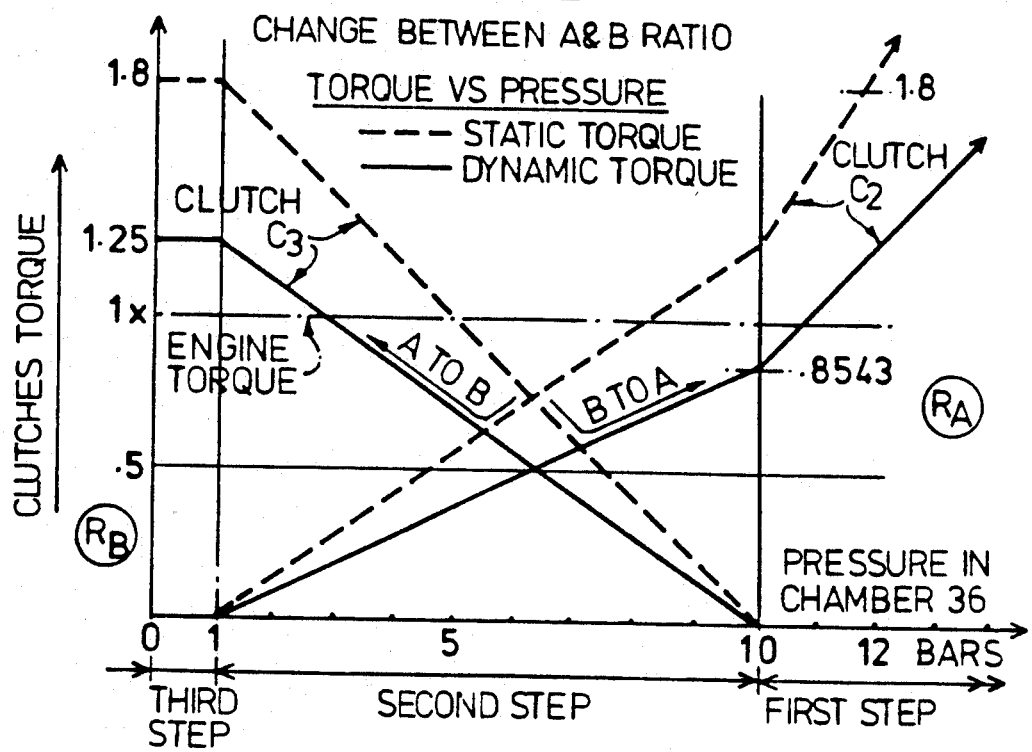
Figure 6B:
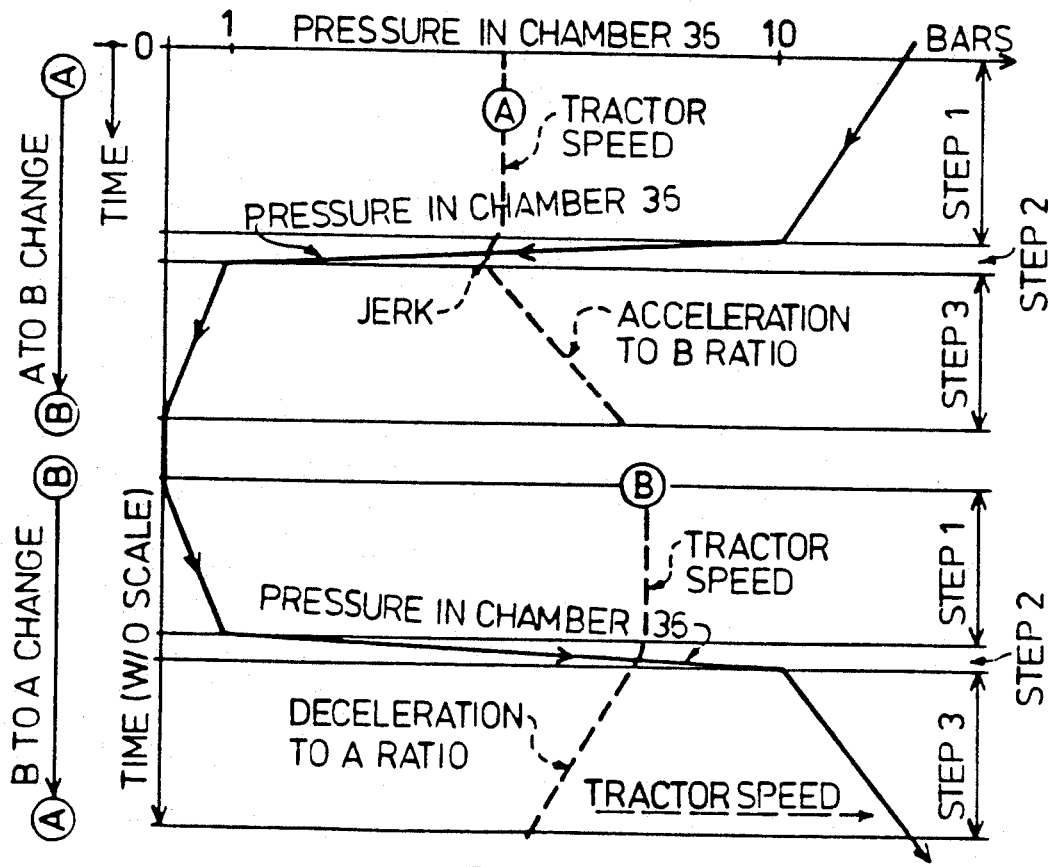
Figure 7A:
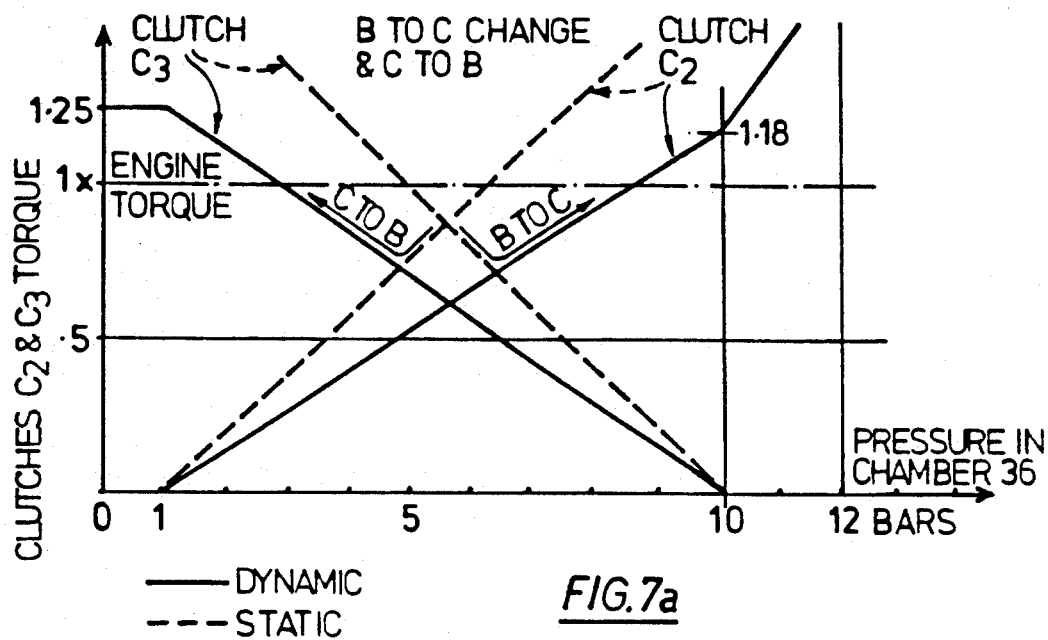
Figure 7B:
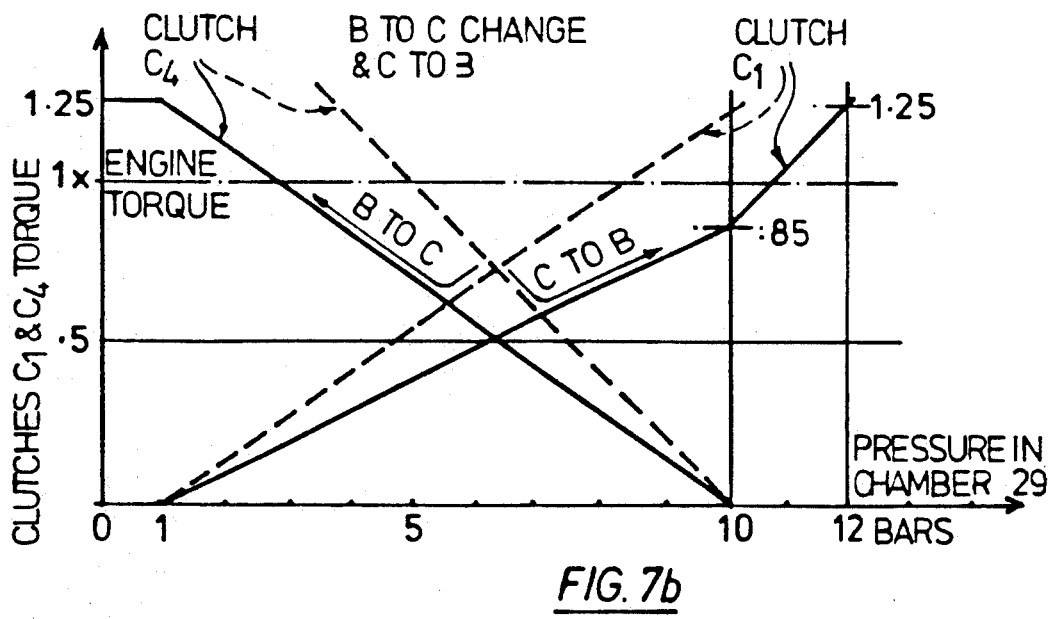
Figure 7C:
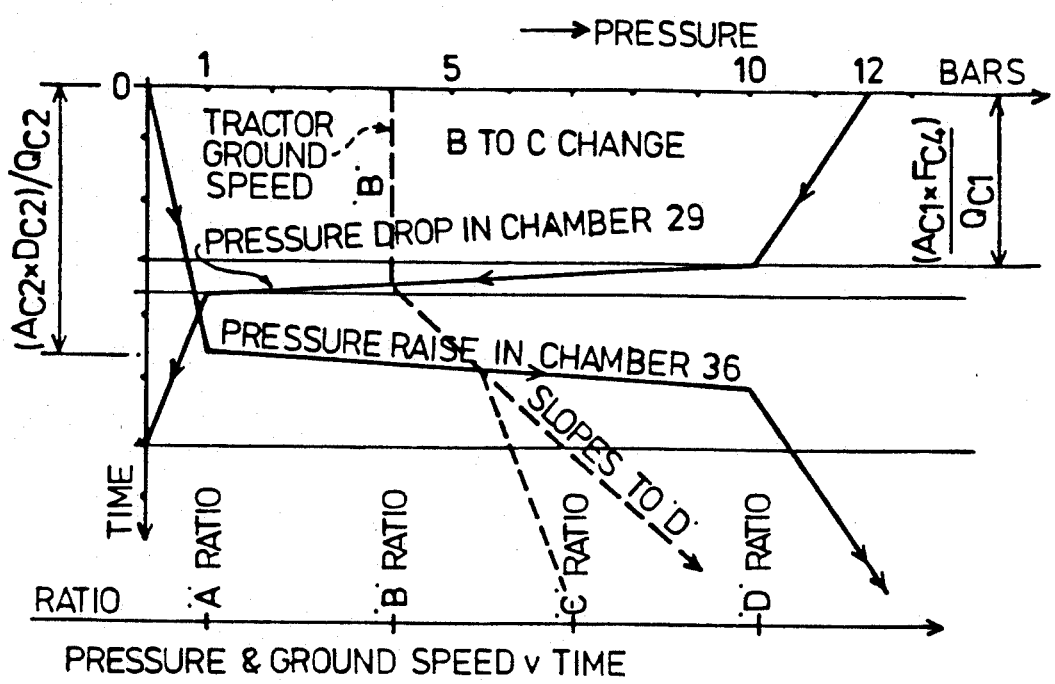
Figure 7D:
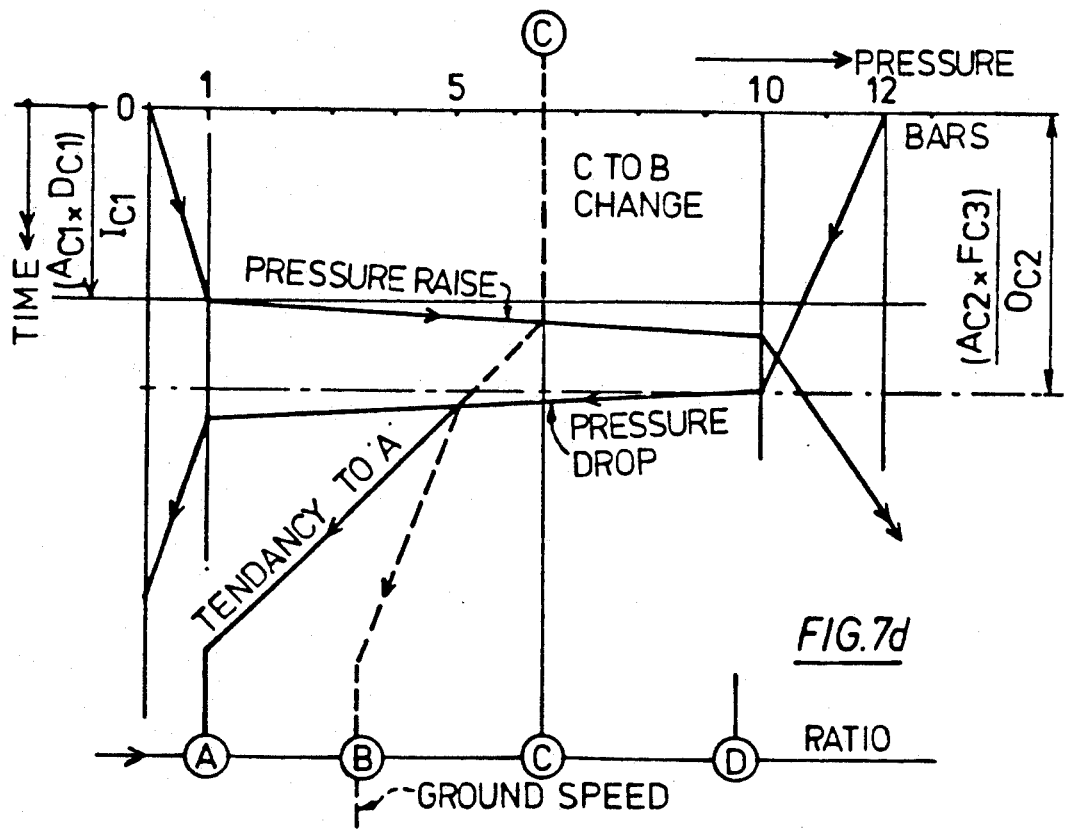
Figure 8:
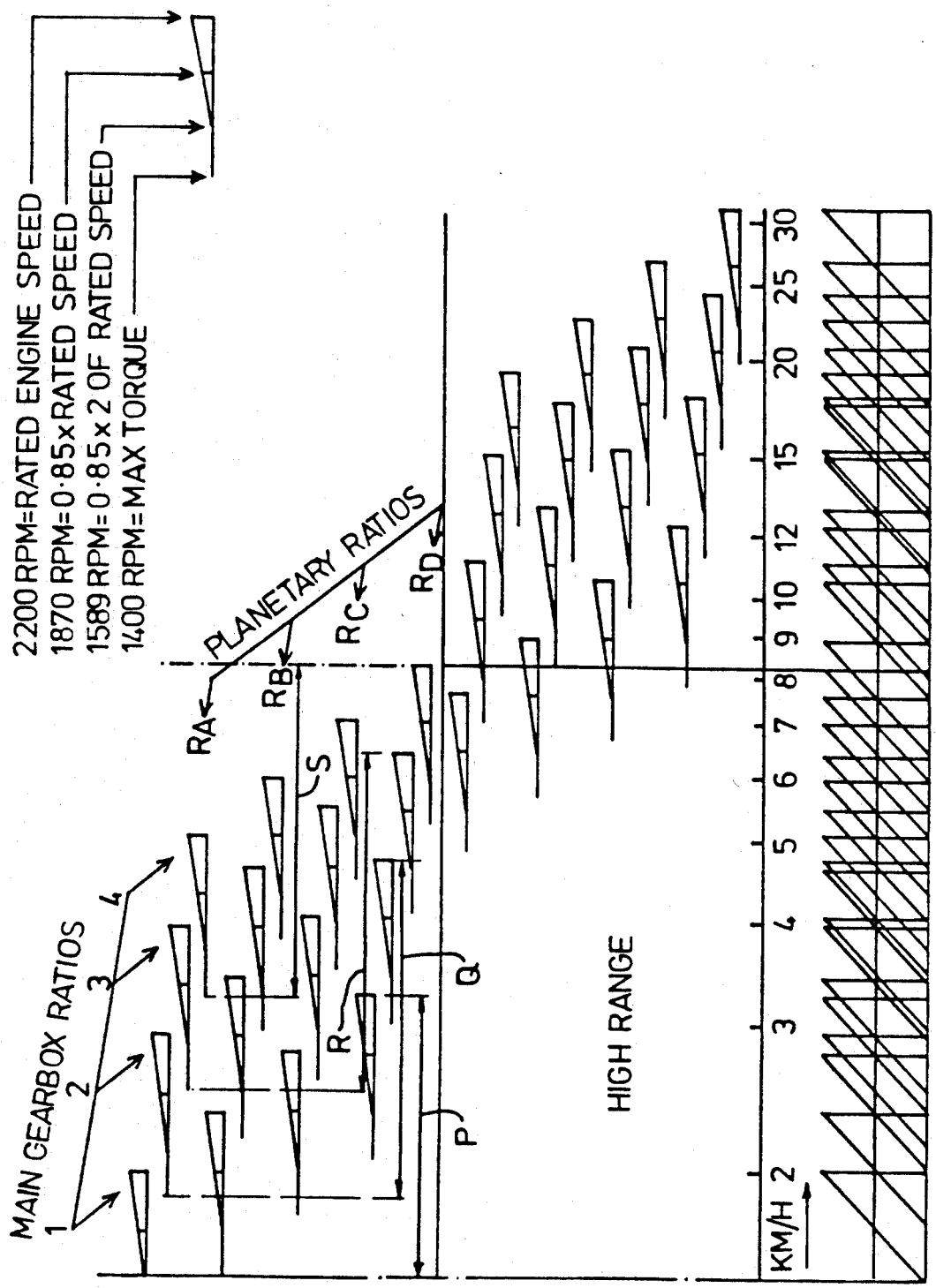
Figure 9:
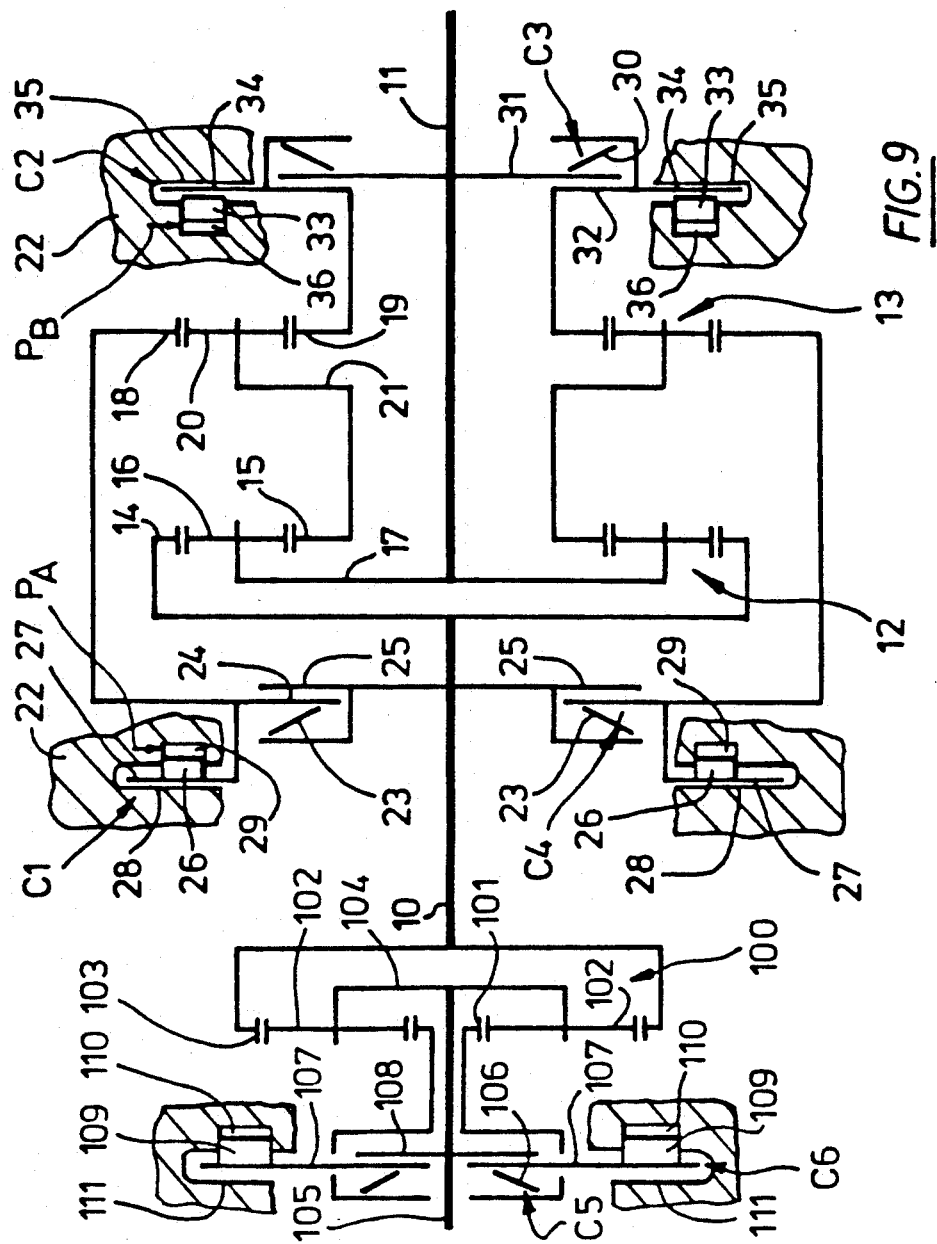
Figures 10, 11:
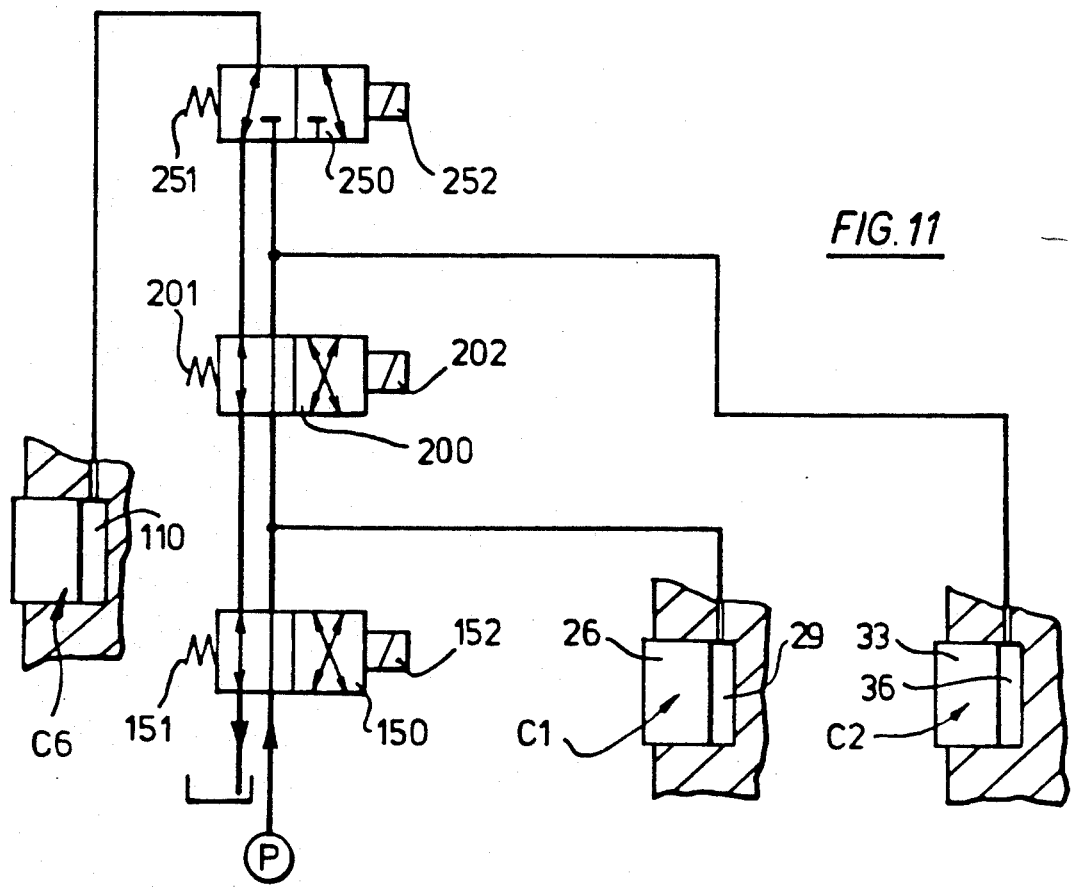
Figures 12, 13:
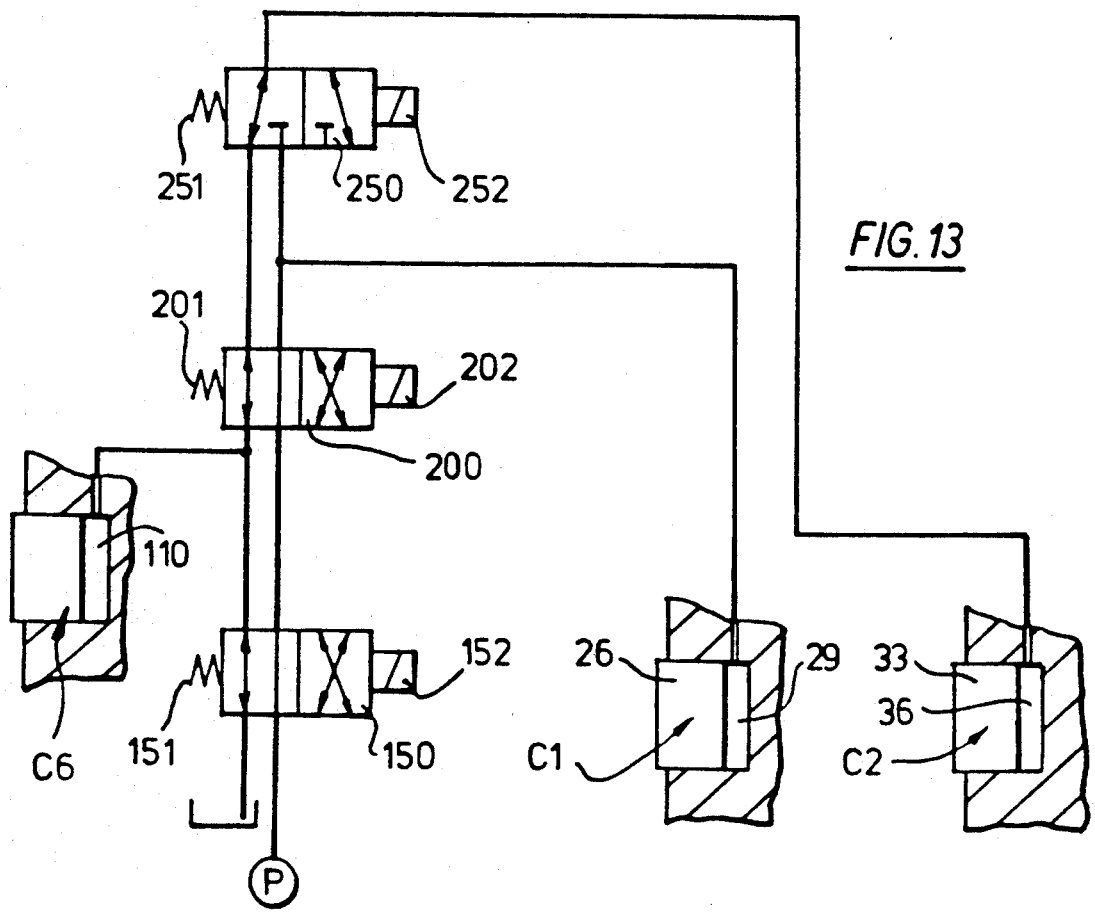
Figures 14, 15:
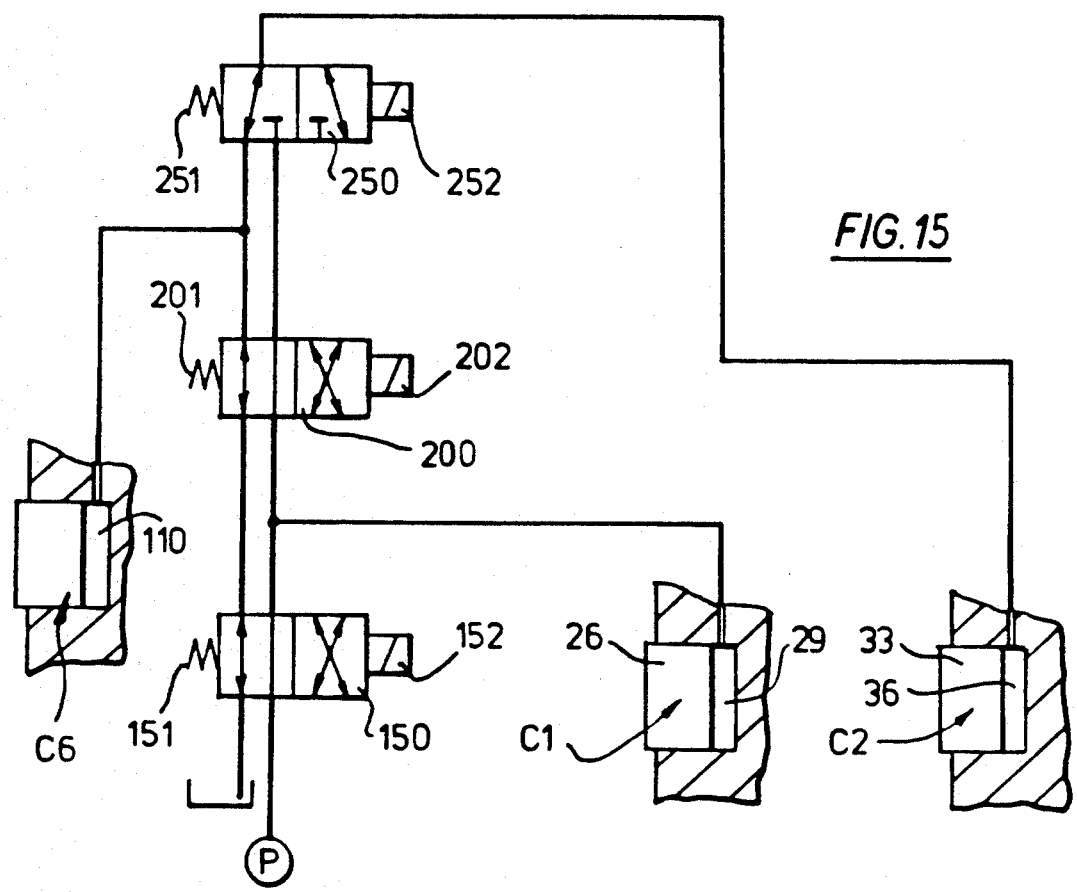

FIGS. 6a and 6b thow the steps involved in changing between ratios RA and RB of the gear unit; FIGS. 7a, b, c and d show the steps involved in changing between ratios RB and RC of the gear unit;

FIG. 8 shows a forward speed chart for a tractor transmission employing the planetary gear unit of FIG. 1;

FIG. 9 is a diagrammatic vertical section through an eight ratio planetary gear unit;

FIG. 10 is a table of the status of the clutches and valves employed to select the ratios of the gear unit of FIG. 9;

FIG. 11 is a schematic diagram of a control circuit for section of the ratios of the gear unit of FIG. 9 in accordance with the table of FIG. 10;

FIG. 12 is a table of the status of the clutches and valves employed to select the ratios of an alternative form of the gear unit of FIG. 9;

FIG. 13 is a schematic diagram of a control circuit for selection of the ratios of the gear unit of FIG. 9 in accordance with the table of FIG. 12;

FIG. 14 is a table of the status of the clutches and valves employed to select the ratios of a still further form of the gear unit of FIG. 9, and FIG. 15 is at schematic diagram of a control circuit for selection of the ratios of the gear unit of FIG. 9 in accordance with the table of FIG. 14.

Figure 2:
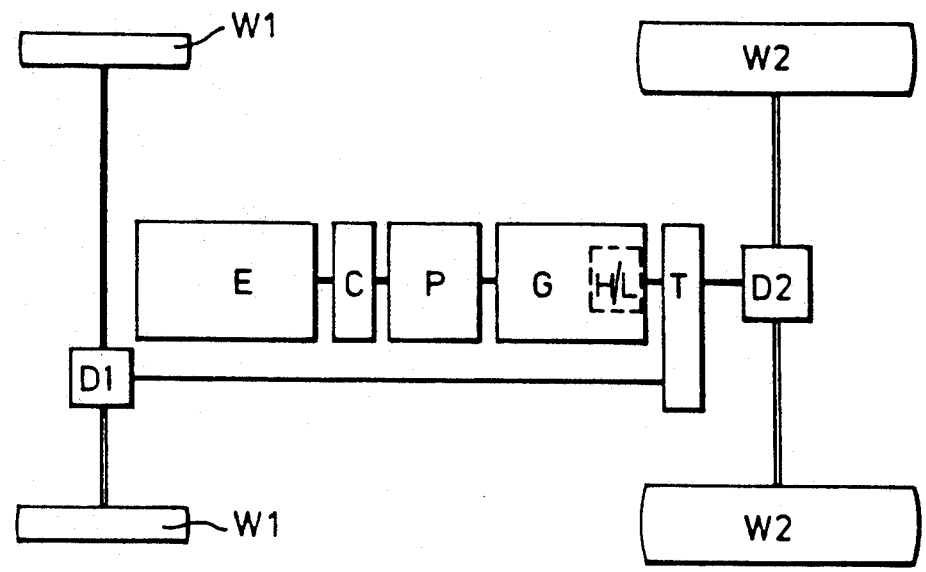
FIG. 2 is a diagrammatic representation of a tractor transmission including the planetary gear unit FIG. 1.

Referring to FIGS. 1 and 2 these show diagrammatically a tractor transmission in which an engine E drives front and rear wheels W1 and W2 via differentials D1 and D2, a main clutch C, a planetary gear unit P, a main gearbox G and a transfer box T. The main gearbox G will typically have four ratios and a forward/reverse direction selection train and may also include a high/low range facility indicated in dotted detail H/L in FIG. 2.

The planetary gear unit P (which is the subject of the previously referred to co-Rending UK patent application) has an input shaft 10 and a co-axial output shaft 11 and a first and second planetary gear trains 12 and 13.

First planetary gear train 12 includes an annulus gear 14, sun gear 15 and planet gears 16 which mesh with annulus gear 14 and sun gear 15 and are carried on a planet carrier 17. In a similar fashion the second planetary gear train 13 includes an annulus gear 18, a sun gear 19 and planet gears 20 carried on a planet carrier 21.

The annulus gear 14 is connected with the input shaft 10, the planet carrier 17 is connected with the output shaft 11, and the sun gear 15 is connected with the planet carrier 21.

The planetary gear unit also includes four clutches. A first clutch C1 is provided which when engaged clutches the annulus gear 18 to a housing 22 of the gear unit. A second clutch C2 which when engaged clutches the sun 19 to the housing 22. A third clutch C3 which when engaged clutches the sun 19 to the output shaft 11 and a fourth clutch C4 which when engaged clutches the input shaft 10 to the annulus gear 18.

The first and fourth clutches operate as a pair with the fourth clutch C4 being spring-engaged by a bellville spring 23 which presses friction elements 24 associated with the annulus 18 into contact with the friction elements 25 associated with the input shaft 10. The first clutch C1 is hydraulically engaged by an actuator in the form of an annular piston 26 which presses friction elements 27 associated with the annulus 18 into contact with elements 28 mounted on the housing 22. The first clutch C1 is engaged by applying a clutch engaging pressure PA to the chamber 29 behind annular piston 26.

As will be appreciated when the chamber 29 is pressurised to engage the first clutch C1 this automatically moves the friction elements 24 against the action of bellville spring 23 to disengage the fourth clutch C4.

In a similar fashion the second and third clutches C2 and C3 operate as a pair with the third clutch C3 being spring-engaged by a belleville spring 30 which brings clutch elements 31 and 32 respectively associated with the output shaft 11 and sun 19 into contact. The second clutch is hydraulically operated by an actuator in the form of an annular piston 33 which brings clutch elements 34 and 35 associated with the sun 19 and housing 22 into contact. Clutch C2 is engaged by applying a clutch actuating pressure PB to chamber 36 behind piston 33. As will be appreciated the engagement of the second clutch C2 also results in the disengagement of the third clutch C3 against the action of the bellville spring 30.

One of the advantages of the above described planetary gear unit is that the number of teeth on the two annulus gears 14 and 18 may be the same as may be the number of teeth on the two sun gears 15 and 19 and the meshing planet gears 16 and 20. This greatly simplifies the construction of the planetary gear unit and significantly reduces the manufacturing cost.

In the particular example under description the annulus gears 14 and 18 are provided with ninety-four teeth (the term 'a' used in the formulae below) and the sun gears 15 and 19 are provide with fifty-eight teeth (the term 's' in the formulae below).

The four operating ratios of the planetary gear unit are obtained as explained below. The various formulae quoted for the ratios obtained are the formulae which apply when the two annulus gears, the two sun gears and the meshing planet gears have the same number of teeth as referred to above.

A first ratio A is obtained when the first and second clutches C1 and C2 are engaged by applying hydraulic pressure to chambers 29 and 35 so that clutches C1 and C2 are engaged and clutches C3 and C4 are held at disengaged. In this condition sun gear 19 and annulus 18 are both clutched to the housing 22 of the gear unit so that the second planetary gear train 13 is completely locked and the ratio RA is given by the formula $$RA = a/(s + a)$$
$$= 94/(58 + 94) = .6184$$

When in the A ratio the total power is transmitted through the first planetary gear train 12 while the torque at the first clutch C1 is 38.16% of the engine torque and the torque at clutch C2 is 23.54% of the engine torque.

A second ratio B is obtained when the first clutch C1 and the third clutch C3 are engaged. In this condition the sun 19 is connected to the output shaft 11 and the annulus 18 is connected with the housing 22. In this condition the sun gear 15 and planet carrier 21 rotate together and the ratio RB is given by the formula $$RB = \frac{1}{1 + s/a - \frac{s^2}{a(s + a)}}$$
$$= \frac{1}{1.3816}$$
$$RB = .7238$$

In range RB the torque of clutch C1 is 38.16% of the engine torque and the torque of clutch C3 is 23.54% of engine torque. Ratio B gives an output speed 17.04% faster than ratio A (ratio A is lower than ratio B by 14.56%).

A third ratio RC is obtained when clutch C2 is engaged and clutch C4 is engaged. In this ratio the annulus gear is connected with the input shaft 10 and sun gear 19 is connected with the housing 22 consequently the planet carrier 21 and sun gear 15 rotate at a speed of $$\frac{94}{(94 + 58)} = .6152 \times \text{the speed of input shaft 10.}$$

The ratio RC is given by the formula $$RC = \frac{(a + 2s)a}{(s + a)^2}$$
$$= \frac{1}{1.1704}$$
$$= .8544$$

When in the ratio RC the torque of clutch C4 is 27.62% of the engine torque and the torque of clutch C2 is 17.04% of engine torguee. Ratio RC gives an output speed 18.04% faster than ratio B (ratio B is lower than ratio C by 15.3%).

A fourth ratio RD is obtained when clutches C3 and C4 are engaged. In this condition the annulus gear 18 is connected to the input shaft 10 and the sun gear 19 is connected to the output shaft 11 so that the two planetary gear trains 12 and 13 are forced to rotate at the same speed to provide a direct drive ratio through the planetary unit thus ratio RD=1. In ratio RD the torque of clutch C4 is 27.62% of the engine torque and at clutch C3 17.04% of engine torque.

It will also be appreciated that since ratio RD is engaged totally mechanically by belleville spring 23 and 30 the planetary gear unit will still function in ratio RD should there be an hydraulic or electrical failure. This is an important practical feature since it provides a "get you home" facility should the vehicle suffer a failure some distance form its base.

Thus the planetary gear unit provides four substantially evenly spaced and relatively closely grouped ratios 0.6184, 0.7238, 0.8544 and 1 which when mated with appropriately chosen ratios in the main gearbox G provides a good spread of operating ratios for a tractor transmission.

The clutch status for each of the four ratios A, B, C and D is shown in tabular form in FIG. 3. As can be seen from FIG. 3, the clutch engagement status does not change in a true binary manner since it is not possible to change between all adjacent ratios by changing the pressurisation state of only one clutch at a time. This non-binary operation of the clutches significantly complicates the provision of an actuating system for the control of clutches C1 to C4 and it is the provision of such an actuating system with which the present invention is concerned.

Figure 4:
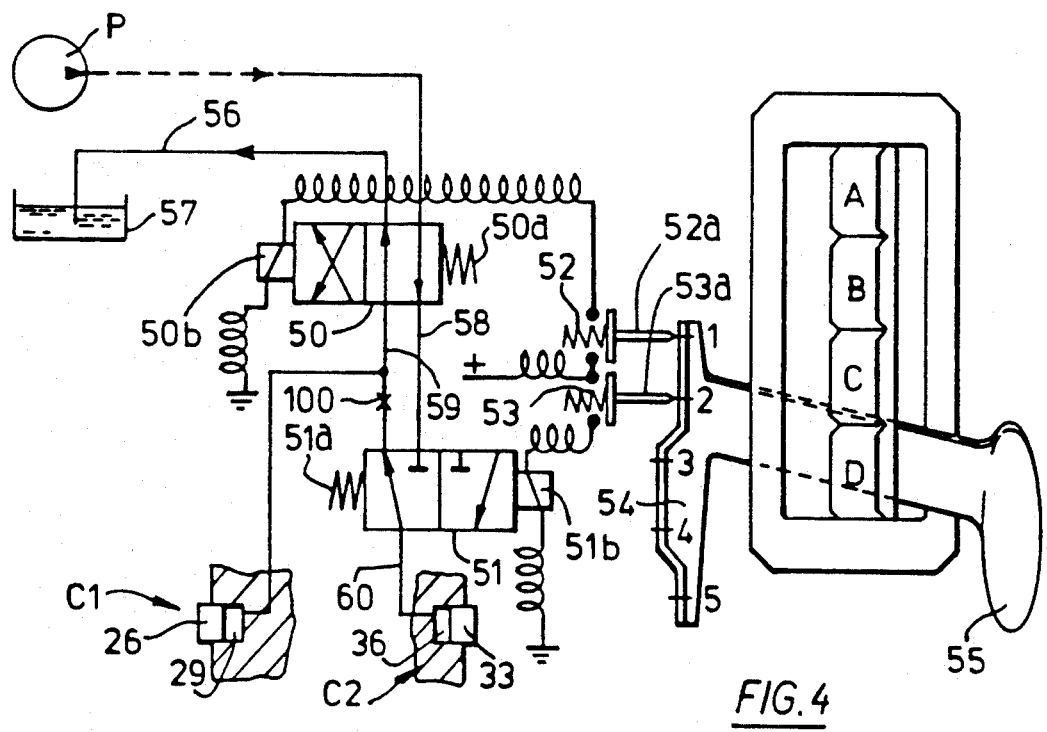
FIG. 4 is a diagramatic representation of an actuating system for the clutches of the planetary gear unit of FIG. 1.

FIG. 4 shows diagrammatically an actuating system which is suitable for the control of clutches C1 and C2. The system includes a four-port two-position flow reversing valve 50 and a three- port two-position flow reversing valve 51 connected in series. Both valves are biased to a first position by respective springs 50a and 51a and are movable by associated solenoids 50b and 51b to their respective second positions. Solenoids 50b and 51b are in turn controlled by switches 52 and 53 which are operated by a cam 54 moved by a ratio selector lever 55.

The first valve 50 in the series connection is supplied with pressurised fluid from a pump P and is connected with a dump line 56 which returns fluid to a reservoir 57. Valve 50 is connected with valve 51 via a first line 58 and a second line 59 which also connects the first valve 50 with the operating chamber 29 of the actuator of clutch C1. The operating chamber 36 of the actuator of clutch C2 is connected downstream of valve 51, which is the last valve in the series connection, by a third line 60.

FIG. 4 shows the actuating system in the position to select ratio RD in the associated planetary gear unit. In this condition operating rods 52a and 53a of both switches 52 and 53 are opposite low positions 1 and 2 of cam 54 so that the switch 52 and 53 are open and the associated solenoids 50b and 51b are not actuated. Thus the valves 50 and 51 are biased into the position shown in FIG. 4 by their associated springs 50a and 51a.

It will be seen from a consideration of FIG. 3 that in order to engage ratio RD both clutches C1 and C2 are to be disengaged. This is the condition set up in figure in 4 in which both the operating chambers 29 and 36 are connected with dump line 56 so that clutches C1 and C2 are not engaged and the ratio RD condition is obtained with clutch C3 and C4 engaged.

To change to ratio RC from ratio RD it is necessary move the selector lever 55 to the C position which moves the high position 3 on cam 54 opposite the operating rod 53a of switch 53 to close switch 53. Low position 2 on the cam 54 is now opposite operating rod 52a of switch 52 so that switch 52 remains open.

Thus solenoid 51b is actuated to pressurise the operating chamber 36 of clutch C2 by via lines 58 and 60 and solenoid 50b remains unactuated to preserve the connection of actuating chamber 29 of clutch C1 with the dump line 56. Thus the ratio RC is engaged by changing the operative position of the solenoid valve 51 only.

Changing between ratio RC and RB requires the operating chamber 29 of clutch C1 to be pressurised and the operating 36 of clutch C2 to be vented. This change in the state of pressurisation of both of the clutch operating chambers is achieved by moving the selector lever 55 to the B position shown in FIG. 4 when high positions 3 and 4 on cam 54 are now opposite operating rods 52a and 53a respectively so that both switches 52 and 53 are closed.

Thus solenoids 50b and 51b are both actuated and line 59 is pressurised from supply P via valve 50 to actuate clutch C1 and lines 58 and 60 are now connected with the dump line 56 via valves 50 and 51. Thus the state of pressurization of both clutches C1 and C2 has been changed and ratio RB is obtained.

To obtain ratio RA from ratio RB the selector lever 55 is moved to the A position of FIG. 4 in which high position 4 of the cam 54 is opposite the operating rod 52a and low position 5 of the cam is opposite the operating rod 53a. In this condition switch 52 is closed and switch 53 is open. Thus line 59 remains pressurised from the supply P via valve 50 to operate clutch C1 and line 59 is now connected with line 60 via valve 51 to also pressurise clutch C2. Thus ratio RA is engaged.

It will be appreciated that changes in the opposite direction from ratio RA through to ratio RD can be made in a similar fashion by moving the selector lever from position A through to position D shown in FIG. 4.

Thus the actuating system shown in FIG. 4 provides an arrangement in which the planetary gear unit can be controlled in a binary manner by changing the state of the control switches 52 and 53 one at a time between each adjacent ratio change.

It will be seen from FIG. 3 that whenever the state of pressurisation of clutch C1 changes, so does the state of clutch C2 and thus clutch C1 is controlled via the four-port valve 50 which changes the status of both clutches. Figure 3 also shows the requirement to change the state of clutch C2 independently of clutch C1 and hence this is controlled by the three-port valve 51.

As will be appreciated from the above description and from a consideration of FIG. 3, changes between the ratios RA and RB and the ratios RC and RD only involve a change in the status of one of the clutches C1 and C2 and are thus relatively easy to accomplish and control. However, changes in both directions between ratios RB and RC involve a change in state of both of the clutches C1 and C2 and this can lead to severe problems if the engagement/disengagement of the clutches C1 and C2 are not properly sequenced.

Considering FIG. 3, for example, it will be observed that if a ratio change is being made from RB to RC and clutch C2 is engaged before C1 is released, ratio RA will be momentarily selected and this will cause a severe jerk in the operation of the transmission.

Similarly when changing the ratio RC to RB if clutch C2 is disengaged before C1 is engaged ratio RD may be momentarily engaged which will again cause a severe jerk.

Thus in order to remove the above possibility of jerky engagement caused by the momentarily engaging of undesirable ratios the sequencing of the engagement/disengagement of clutches C1 and C2 is arranged so that when changing up from ratio RB to RC clutch C1 is disengaged before clutch C2 is engaged so that if any other ratio is momentarily engaged it will be ratio RD which is a higher ratio and thus moving in the same direction (that is upwards) as the desired ratio change between ratios RB and RC. This will effectively remove any jerkiness in the ratio change.

In a similar fashion when changing down from ratio RC to RB the sequencing of clutches C1 and C2 id arranged so that clutch C1 is engaged momentarily before clutch C2 so that if there is a tendency to engage any other ratio it will be the ratio RA which is a lower ratio and thus in the same direction (that is downwards) as the desired ratio change from RC to RB. This again affectively removes any jerk in the ratio change.

The above sequencing of the change in status of clutches C1 and C2 when changing between ratios RB and RC is achieved by carefully matching the fluid flow rates to and from the operating chambers 29 and 36 of clutches C1 and C2, by matching the volumes of these operating chambers and by carefully matching the free play in all four clutches of the planetary gear unit.

Figure 5:
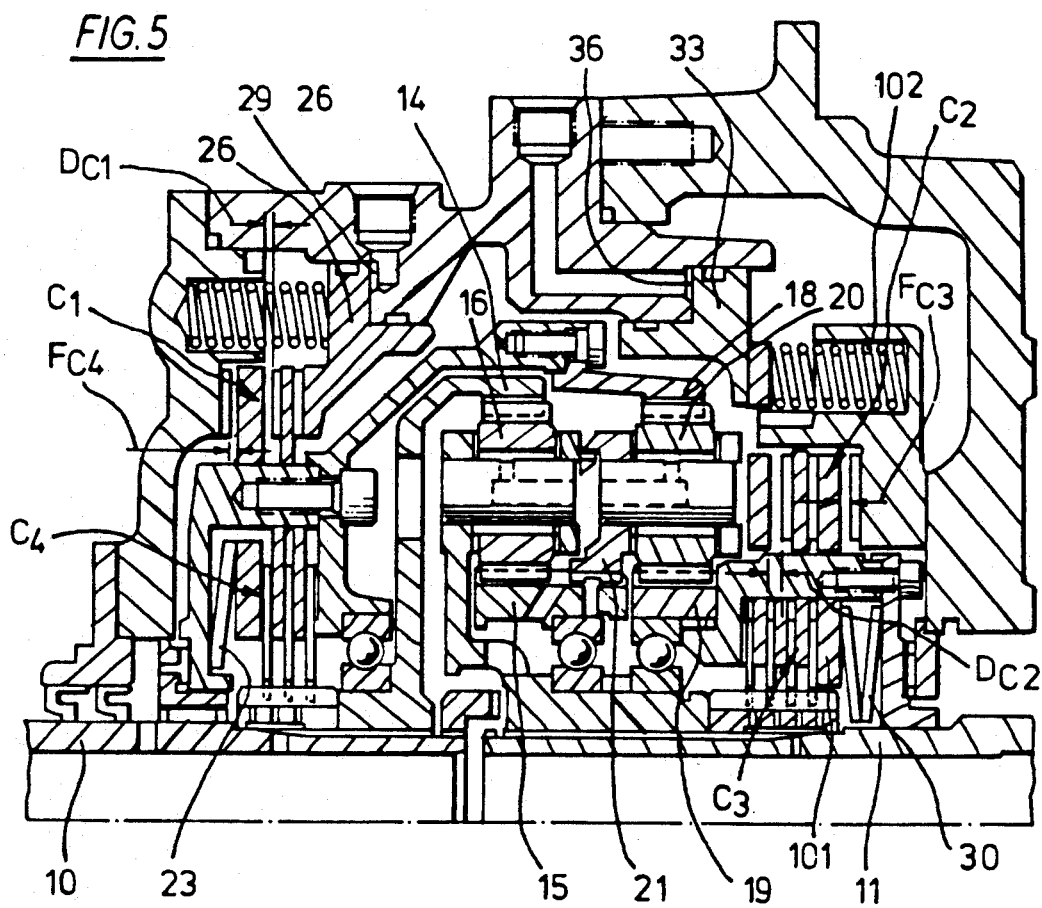
FIG. 5 is a vertical half-section through a working version of the planetary gear unit of FIG. 1.

Referring to FIG. 5 this shows a vertical half section through a working version of the planetary gear unit shown in FIG. 1 in which each clutch is of a multi-plate type and in which components equivalent to those described above in relation to figure I have been similarly numbered.

As indicated above, when changing up from ratio RB to ratio RC the sequencing of the change in state of clutches C1 and C2 is arranged to be such that clutch C1 is disengaged before clutch C2 is engaged. In other words the time taken to move the piston 33 of clutch C2 in order to take up the free play in clutch C2 must be greater than the time taken to move the piston 26 of clutch C1 sufficiently to effectively disengage clutch C1. The movement to effectively disengage C1 is equal to the free play of the paired clutch C4.

This sequencing requirement can be expressed mathematically as follows:

$$(AC2 \times DC2)/IC2 > (AC1 \times FC4)/OC1$$

where

AC2 = Surface area of piston 33 of clutch C2 exposed to pressure.

AC1 = Surface area of piston 26 of clutch C1 exposed to pressure.

DC2 = Approach travel for piston 33 on engagement of clutch C2.

FC4 = Free play prior to engagement of clutch C4.

IC2 = Flow rate of fluid into chamber 36 during engagement of clutch C2.

OC1 = Flow rate of fluid out of chamber 29 on disengagement of clutch C1.

The distances DC2 and FC4 are marked in FIG. 5.

As will be appreciated the flow rates IC2 and OC1 are defined by the design of the hydraulic circuit shown in FIG. 4. It will be seen from FIG. 4 that the flow OC1 from clutch C1 flows through one valve 50 whereas flow IC2 to clutch C2 flows through two valves 50 and 51. Thus the flow to and from clutch C1 tends to be greater than that to and from clutch C2. This assists in ensuring that the above mathematical relationship is maintained. If necessary a fixed or variable restrictor 100 can be located in the supply line to chamber 36 to further accentuate the difilerence in flow rates.

Unfortunately AC1 AC2 which goes against the desired relationship. Also DC2 and FC4 vary with manufacturing tolerances so that each unit must be shimmed to ensure that the design figures for these distances are achieved.

As indicated above, when changing from ratio RC to ratio RB the sequencing of the change in state of clutches C1 and C2 is such that clutch C1 must be engaged momentarily before clutch C2 is disengaged. In other words the time taken to move piston 26 to take up the free play in clutch C1 must be less than the time taken to move piston 33 sufficiently to disengage clutch C2 the movement of piston 33 to disengage clutch C2 is equal to the free play of the paired clutch C3.

This sequencing requirement can be expressed mathematically as follows:

$$(AC2 \times FC3)/OC2 \geq (AC1 \times DC1)/IC1$$

where

FC3 = Free play prior to engagement of clutch C3.

DC1 = Approach travel for piston 26 on engagement of clutch C1.

OC2 = Flow rate of fluid out of chamber 36 on disengagement of clutch C2.

IC1 = Flow rate of fluid into chamber 29 on engagement of clutch C1.

Since flow rate OC2 is less than IC1 there is no inconsistency with the earlier desired relationship for changing from RB to RC. Shimming is again necessary to ensure that distances FC3 and DC1 are maintained at their design values in each unit.

The actual steps involved in changing between the ratios RA and RB are shown diagrammatically in FIGS. 6a and 6b. The same sequence also applies to changes between ratios RC and RD since in both cases only piston 33 must be depressurised.

When in ratio RA piston 33 is pressurised to 16 bar. Clutch C2 is capable of carrying 1.8 times the maximum torque viewed by the engine at pressures down to 12 bar.

When the operator moves lever 55 from position A to position B valve 51 connects chamber 36 to reservoir 57 and within a first step lasting approximately 0.1 seconds the clutch plate 101 (see FIG. 5) moves under the action of spring 30 to take up the free play FC3 of clutch C3.

In this position the pressure in chamber 36 is approximately 10 bars and the clutch C2 is carrying a static torque approximately equal to the maximum torque of the engine.

In a second very short step lasting 0.01 seconds the pressure decreases from 10 bars to 1 bar. At 10 bars the force exerted by piston 33 is equal to the force of spring 30 so that the torque on clutch C3 is nil. At 1 bar the clutch C3 is fully engaged (1 bar being the pressure necessary to balance the return springs of clutch C2). During this step the static torque of clutch C2 decreases and the dynamic torque of clutch C3 increases until clutch C2 begins to slip (at approx 7 bars) and the ratio changes.

Since between these two pressures (10 bars to 1 bar) the piston 33 does not move theoretically, any displacement which takes place is dictated by the mechanical deflection of the clutch plates etc. For this reason the time needed to effect the ratio change is short resulting in a clear and short transfer of load from one clutch t the other without the need to employ proportional flow valves.

In the third and final step of the change the pressure in chamber 36 falls from 1 to 0 bars and the piston 33 is moved back under the action of return springs 102 to establish the approach travel DC2 of clutch C2. Clutch C3 continues to slip until the energy needed to accelerate the vehicle is spent which is dependant on the load.

The same three step change sequence applies to the more complex changes between ratios RB and RC and is shown diagrammatically in FIGS. 7a, b, c, and d.

As stated above the maximum torque of the hydraulic clutches C1 and C2 is obtained at a pressure of 16 bars. Also since the time taken to take up the free play FC3 and FC4 in clutches C3 and C4 is approximately 0.1 seconds a good progressive and smooth transfer of load to the hydraulic clutches takes place during this time as the engaging clutch slips since the torque is around the engine torque.

An important feature of the planetary gear described above is that both hydraulically operated clutches C1 and C2 employ non-rotating pistons 26 and 33 respectively which act to clutch parts of the planetary gear to the casing. This gives a shorter response time and due to the use of non-rotating piston seals improves reliability and gives a lower cost.

Also since the control of the transfer of load between the clutches is built into the mechanical design of the system there is no need for complicated electronic or hydraulic control systems.

FIG. 8 shows a forward speed chart for a planetary gear unit as shown in FIGS. 1 and 5 connected with a four speed gearbox G including a high/low range change stage H/L to provide 32 forward speeds up to just over 30 K.p.h. in the example given. This combination of a planetary unit and main gearbox with two speed range change stage provides a particularly appropriate overall grouping of ratios for a tractor transmission.

As can be seen from FIG. 8, with ratio one engaged in the main gearbox, it is possible to drive at speeds ranging from approximately 0 to 3.25 Kph by changing between the ratios RA, RB, RC and RD of the planetary unit (see line P in FIG. 8). Similarly, with ratio two engaged in the main gearbox and the planetary unit changed between the ratios RA to RD the speed range of approximately 0.75 to 4.75 Kph is covered (see line Q in FIG. 8). Lines R and S in FIG. 8 show the speed ranges covered when ratios 3 and 4 are engaged in the main gearbox and the planetary unit is changed between its ratios RA to RD.

The top half of FIG. 8 shows the sixteen speed ranges obtained when the range change stage (H/L) of the transmission is in its low range ratio and the bottom half of FIG. 8 shows the further sixteen speed ranges obtained when the range change stage is changed into its high range ratio. As can be seen, the speed ranges in the high range ratio are similarly grouped to the speed ranges in the low range ratio described above.

As is evident from the lines P, Q, R and S, referred to above, the speed ranges provided by the planetary unit when each of the main gearbox ratios 1 to 4 is engaged overlap considerably so that no matter where the tractor operator needs to operate in, for example, the range 0 to approximately 8.25 Kph of the upper part of FIG. 8, he can arrange by selecting the appropriate main gearbox ratio to be operating in one of the mid-ratios (e.g. RB, RC) provided by the planetary unit when the low range is engaged. Thus he should be able to change up and down within the speed range provided by the planetary unit to meet likely variations in load, etc. without the need to operate the main clutch C to change the ratio in the main gearbox G. This is a particularly convenient arrangement for use in a tractor.

The term clutch as used throughout this specification has been used to refer to a unit such as clutch C3 or C4, which connects together two rotatable members of the planetary gear for co-rotation or to a unit such as clutch C1 and C2 which connects a rotatable member of the planetary gear to ground (i.e. stops rotation or brakes the rotatable member).

The control principles described above in relation to the four ratio planetary gear unit of FIGS. 1 and 5 can be extended to, for example, the eight speed planetary gear unit of FIG. 9 which comprises the four ratio unit of FIGS. 1 and 5 with an additional two-speed planetary input section 100 having a sun 101, planets 102, an annulus 103 and a carrier 104. The input 10 to the four ratio planetary unit is connected to the annulus 103 and an input 105 drives the carrier 104.

A spring-engaged clutch C5 is provided in which a belleville washer 106 biases friction elements 107 associated with sun 101 into engagement with elements 108 associated with carrier 104 to lock-up input section 100 to provide a direct drive ratio. An hydraulically operated clutch C6 is engaged by an actuator in the form of an annular piston 109 operating in a chamber 110. When pressurised, piston 109 engages elements 107 associated with sun 101 with elements 111 associated with the unit casing to provide a planetary overdrive ratio. As in the four ratio unit the clutches C5 and C6 are paired together so that when clutch CG is engaged clutch CS is automatically disengaged and vice versa.

It will be appreciated that by reversing the input section 100 so that the input shaft 105 drives annulus 103 and carrier 104 is connected to the four ratio input 10, an underdrive ratio can be obtained.

The four ratio section can be arranged to provide four equally spaced ratios having the following relationship:

$RA = 1/x^3$
$RB = 1/x^2$
$RC = 1/x^1$
$RD = 1/x^0 = 1$

If the two speed input section is arranged to provide a direct drive ratio P1 of 1 and an overdrive ratio P2 of x then the eight ratios provided by the combination of the two ratio and 4 ratio sections are:

$R1 = RA \times P1 = 1/x^3$
$R2 = RA \times P2 = 1/x^{2.5}$
$R3 = RB \times P1 = 1/x^2$
$R4 = RB \times P2 = 1/x^{1.5}$
$R5 = RC \times P1 = 1/x^1$
$R6 = RC \times P1 = 1/x^{0.5}$
$R7 = RD \times P1 = 1/x^0 = 1$
$R8 = RD \times P2 = 1/x^{-31\ 0-5} = \sqrt{x}$ The left-hand half of the table shown in FIG. 10 shows the status of the 3 hydraulic clutches C1, C2 and C6 to obtain the above ratios in the arrangement shown in FIG. 9. It is possible to obtain the binary valve operating sequence shown in the right-hand half of FIG. 10 using the hydraulic control circuit shown diagrammatically in FIG. 11.

This circuit comprises a series connection of three two-position flow reversing valves 150, 200 and 250. Each valve is biased by an associated spring 151, 201 and 251 to the position shown in FIG. 11 and is movable to its alternative position by an associated solenoid 152, 202 and 252. Valves 150 and 200 are four-port valves and valve 250 is a three-port valve.

The operating chamber 110 of clutch C6 is connected downstream of the valve 250 by a line 253. The operating chamber 36 of clutch C2 is connected between the second valve 200 and the third or last valve 250 whilst the operating chamber 29 of clutch C1 is connected between the first valve 150 and the second valve 200.

It will be seen that a change in the status of the first valve 150 changes the state of pressurisation of all three clutches, whereas a change in the status of valve 200 changes only the status of clutches C2 and CE. valve 250 controls only the status of clutch C6.

Thus the circuit of FIG. 11 accomplishes binary control of the eight ratio arrangement, as can be clearly seen from the valve status chart on the right-hand half of FIG. 10.

A whole series of different ratio relationships are possible for the eight ratio arrangement shown in FIG. 9 by varying the overdrive ratio. For example, using a direct drive ratio Pl of 1 and an overdrive ratio P2 of x4 (or underdrive of ratio of 1/x4) the following sequential ratios with a constant step of x can be obtained:

$R1 = RA \times P1 = 1/x^3$
$R2 = RB \times P1 = 1/x^2$
$R3 = RC \times P1 = 1/x^1$
$R4 = RD \times P1 = 1$
$R5 = RA \times P2 = x$
$R6 = RB \times P2 = x^2$
$R7 = RC \times P2 = x^3$
$R8 = RD \times P2 = x^4$ The left-hand half of FIG. 12 shows the status of the clutches C1, C2 and C6 required to obtain the above eight ratios and FIG. 13 shows a control circuit enabling the binary valve status control shown in the right-hand half of FIG. 12 to be achieved.

In FIG. 13 the valves 150, 200 and 250 are again employed in a series connection but with different connections to the operating chambers 29, 36 and 110 of the clutches C1, C2 and C6.

In the arrangement shown in FIG. 13 the operating chamber 36 of clutch C2 is connected downstream of the three-port valve 250, operating chamber 36 of clutch C1 is connected between second valve 200 and the last valve 250 and the operating chamber of 110 of clutch C6 is connected between the first valve 150 and the second valve 200.

It will be seen that a change in the status of the first valve 150 changes the status of all three clutches C1, C2 and C6, a change in the status of the second valve 200 changes only the status of clutches C1 and C2 and a change in the status of t%e last valve 250 changes only the status of clutch C2. This valve arrangement enables the binary valve operating sequence shown in the right-hand half of FIG. 12 to be obtained.

If the ratios provided by the four-ratio section of the gear unit of FIG. 9 are organized to provide a large step between ratio B and C, such that the four ratios provided are:

$RA = 1/x^5$
$RB = 1/x^4$
$RC = 1/x$
$RD = 1$

This can then be combined with a two-speed input providing an overdrive ratio P2 of x to give the eight following evenly-spaced shift ratio:

$R1 = RA \times P1 = 1/x^5$
$R2 = RB \times P1 = 1/x^4$
$R3 = RA \times P2 = 1/x^3$
$R4 = RB \times P2 = 1/x^2$
$R5 = RC \times P1 = 1/x$
$R6 = RD \times P1 = 1$
$R7 = RC \times P2 = x$
$R8 = RD \times P2 = x^2$ The left-hand half of FIG. 14 gives the status of the clutches C1, C2 and C6 required to obtain the above ratio sequence and FIG. 15 shows an hydraulic circuit for achieving these clutch status conditions using the binary valve status sequence shown in the right-hand half of Figure 14.

In FIG. 15 the valves 150, 200 and 250 are again connected in series but on this occasion the operating chamber 36 of clutch C2 is connected downstream of the last valve 250, operating chamber 110 clutch C6 is connected between the last valve 250 and the second valve 200 and the operating chamber 29 of clutch C1 is connected between the first vale 150 and the second valve 200. In this arrangement the change in the status of the first valve 150 changes the status of all three clutches C1, C2 and CG, changing the status of valve 200 changes only-the status of clutches C6 and C2 and a change in the status of valve 250 changes only the status of clutch C2.

FIG. 4 shows a switch arrangement operated by a selector lever 55 for controlling the operation of the solenoids of valves 50 and 51. It will be appreciated that a microprocessor could replace the cam and switch arrangement and provide the required binary valve operating sequence in response to movement of an associated selector lever in such an arrangement, for example, a sensor would sense the position of the selector lever and indicate this position to the microprocessor which would in turn produce an appropriate output signal which would result in the activation of the appropriate valve solenoid(s).

A cam and switch or an alternative microprocessor control arrangement can be used for the control of the valve solenoid activation sequence in all the actuating systems disclosed above in FIGS. 4, 11, 13 and 15.

I claim:

1. A gear unit providing a plurality of operative ratios and having a plurality of fluid pressure operated ratio engaging clutches (C1, C2), the gear unit being characterised by the inclusion of:

a plurality of fluid pressure operated clutch actuators (26, 29 : 33, 36) one for each fluid pressure operated clutch, a plurality of two-position flow reversing valves (50, 51), one valve for each fluid pressure operated actuator, the valves being hydraulically connected in series with at least one actuator (33, 36) connected downstream of the last valve (51) in the series connection and at least one actuator (26, 29) connected between each valve of the series, and valve control means (50a–54) for controlling the operating sequence of the valves so that by changing the operative condition of one valve at a time the operative ratio of the gear unit can be changed to the next adjacent ratio provided by the unit in a progressive manner throughout the entire ratio range of the unit.

2. A gear unit according to claim 1 having first and second fluid pressure operated ratio engaging clutches (C1, C2), the unit being characterised by the inclusion of two flow reversing valves (50, 51), in series, the last valve (51) in the series being a three port valve and the other valve (50) being a four port valve.

3. A gear unit according to claim 2 characterised in that the first fluid pressure operated clutch (C1) is paired with a first spring-engaged clutch (C4) and the second fluid pressure operated clutch (C2) is paired with a second spring-engaged clutch (C3), the arrangement being such that when the pressure operated clutch cf each respective pair is engaged, the spring-engaged clutch of the respective pair is automatically disengaged and vice versa providing four ratio engaging clutch conditions.

4. A gear unit according to claim 3 characterised by the inclusion of an additional two ratio section in series (100) with the four ratio section, said additional two ratio section including a third fluid pressure operated clutch (C6) and a third spring-engaged clutch (C5) to engage the two additional ratios, and a third flow reversing valve (250) for the control of an actuator (109, 110) for the third fluid pressure operated clutch.

5. A gear unit according to claim 4 characterised in that the actuator (109, 110) of the fluid pressure operated clutch (C6) of the additional two ratio section (100) is connected downstream of the last valve (250) in the series connection and the other two clutch actuators (26, 29 : 33, 36) are connected one (33, 36) between the second (200) and last (250) valves and the other (26, 29) between the first (150) and second (200) valves respectively.

6. A gear unit according to claim 4 characterised in that one (33, 36) of the clutch actuators of the four ratio section is connected downstream of the last valve (250) in the series connection, the other clutch actuator (33, 36) of the four ratio section is connected between the second (200) and last (250) valves, and the actuator (109, 110) of the fluid pressure operated clutch (C6) of the two speed section (100) is connected between the first (150) and second (200) valves.

7. A gear unit according to claim 4 characterised in that one (33, 36) of the clutch actuators of the fourth ratio section is connected downstream of the last valve (250) in the series connection, the other clutch actuator (26, 29) of the four ratio section is connected between the first (150) and second (200) valves, and the actuator (109, 110) of the fluid pressure operated clutch (C6) of the two speed section (100) is connected between the second (200) and last (250) valves.

8. A gear unit according to any one of claims 1 to 7 characterised in that when changing between these adjacent ratios (B, C) which require a change in engagement status of two fluid pressure operated clutches (C1, C2), the engagement/disengagement of the clutches is sequenced to ensure that if any other transient ratio state (A, D) is engaged during the ratio change, it is a ratio state moving in the same direction (i.e. up or down) as the desired ratio change.

9. A gear unit according to claim 1 characterised in that the engagement/disengagement of the fluid pressure operated clutches (C1, C2) is sequenced by matching the flow rates to and from the associated clutch actuators (26, 29 : 33, 36) and by matching the free play (DC1, DC2) in the clutches.

10. A gear unit according to claim 1 characterised in that the valves (50, 51) which control the fluid pressure operated clutches (C1, C2) are solenoid-operated each being biased (50a, 51a) to one position and movable by its associated solenoid (50b, 51b) to its other position on closing of an associated switch (52, 53) which energises the solenoid.

11. A gear unit according to claim 10 characterised in that the valve control means (50a-54) includes cam means (54) moved by a ratio selector means (55), the cam means operating the switches (52, 53) in a predetermined sequence to operate the clutches in the required order.

12. A gear unit according to claim 1 characterised in that the valves (50, 51) which control the fluid pressure operated clutches (C1, C2) are solenoid-operated each being biased (50a, 51a) to one position and movable by its associated solenoid (50b, 51b) to its other position under the control of a microprocessor operated by a ratio selector means.

13. A gear unit providing a plurality of operative ratios engaged by clutches (C1, C2, C3, C4), the unit being characterised in that the clutches are grouped together in pairs each pair consisting of a fluid-pressure pressure operated clutch (C1, C2) and a spring-applied clutch (C3, C4) which is automatically released when its paired fluid pressure operated clutch is engaged, the operation of the clutches being controlled so that whenever a ratio change between adjacent ratios requires a change in the engagement status of two fluid pressure operated clutches, the engagement/disengagement of said two clutches is sequenced to ensure that if any other transient ratio is engaged during the ratio change, it will be a ratio state moving in the same direction (i.e. up or down) as the desired ratio change.

14. A vehicle transmission characterised by the combination of a first gear unit (P) according to claim 1 providing a group of ratios and a second gear unit (G) arranged in series with the first unit, said second gear unit providing a plurality of further ratios which multiply the number of groups of ratios provided by the first gear unit, the ratios of the second gear unit being chosen to provide considerable overlap between adjacent groups of ratios provided by the first gear unit to ensure that at whatever speed it is necessary to operate the associate vehicle, the vehicle operator can select a ratio in the second gear unit such that the required operating speed can be provided by a mid-ratio of one of the groups of ratios provided by the first gear unit.

15. A vehicle transmission comprising:
a first gear unit (P) providing a group of ratios; and
a second gear unit (G) arranged in series with said first gear unit, said second gear unit providing a plurality of further ratios which multiply the number of groups of ratios provided by said first gear unit, characterized in that the ratios of said second gear unit are chosen to provide considerable overlap between adjacent groups of ratios provided by said first gear unit to insure that at whatever speed it is necessary to operate an associated vehicle, a vehicle operator can select a ratio in said second gear unit such that the required operating speed can be provided by a mid-ratio or one of said groups of ratios provided by said first gear unit.

16. A vehicle transmission according to claim 15 characterized in that the vehicle operator can change up or down within the operative group of ratios provided by said first gear unit (P) to meet likely variations in load without need to change the ratio selected in said second gear unit (G).

* * * * *